(12) United States Patent
Karnamadakala et al.

(10) Patent No.: US 12,511,704 B2
(45) Date of Patent: Dec. 30, 2025

(54) METHOD FOR PERFORMING TILE TO RASTER (T2R) CONVERSION IN DEEP LEARNING HARDWARE ACCELERATOR

(71) Applicant: SAMSUNG ELECTRONICS CO., LTD., Suwon-si (KR)

(72) Inventors: Prashanth Karnamadakala, Bengaluru (IN); Deepak Irappa Hanagandi, Bengaluru (IN); Nitin Gera, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 18/436,757

(22) Filed: Feb. 8, 2024

(65) Prior Publication Data

US 2025/0200691 A1 Jun. 19, 2025

(30) Foreign Application Priority Data

Dec. 15, 2023 (IN) .............................. 202341085894

(51) Int. Cl.
*G06T 1/20* (2006.01)
*G06T 1/60* (2006.01)
(52) U.S. Cl.
CPC .................. *G06T 1/20* (2013.01); *G06T 1/60* (2013.01); *G06T 2200/28* (2013.01)
(58) Field of Classification Search
CPC ........... G06T 1/20; G06T 1/60; G06T 15/005; G06T 2200/28
USPC ........................................................ 345/503
See application file for complete search history.

(56) References Cited

U.S. PATENT DOCUMENTS

| | | |
|---|---|---|
| 5,233,689 A | 8/1993 | Rhoden et al. |
| RE36,145 E | 3/1999 | DeAguiar et al. |
| 6,798,421 B2 | 9/2004 | Baldwin |
| 7,061,495 B1 | 6/2006 | Leather |
| 7,065,263 B2 | 6/2006 | Ueda |
| 7,190,413 B2 | 3/2007 | Linzer et al. |
| 7,286,720 B2 | 10/2007 | Ueda |
| 7,535,474 B1 | 5/2009 | Scholander et al. |
| 8,933,945 B2 | 1/2015 | Leather et al. |
| 9,800,874 B2 | 10/2017 | Hashimoto et al. |
| 10,218,991 B2 | 2/2019 | Okawa |
| 10,997,686 B2 | 5/2021 | Vembu et al. |
| 11,100,830 B2 | 8/2021 | Aksit |
| 11,270,416 B2 | 3/2022 | Subramanya et al. |

(Continued)

FOREIGN PATENT DOCUMENTS

| | | |
|---|---|---|
| EP | 0570722 | 11/1993 |
| GB | 201908535 | 6/2019 |
| JP | 5436501 | 12/2013 |

*Primary Examiner* — Jacinta M Crawford
(74) *Attorney, Agent, or Firm* — Morgan, Lewis & Bockius LLP

(57) ABSTRACT

A method for performing Tile to Raster (T2R) conversion includes: receiving tile input data including a stream of a plurality of tiles each having a tile height, a tile input width, a macroblock width (MBW), and data bits; segmenting the tile input data based on a total number of virtual square tiles; segmenting a Tile Buffer (TB) into one or more of the virtual square tiles based on the received tile input data; and performing a raster-scanning operation on each of the segmented tile input data and the segmented TB based on the total number of virtual square tiles to generate raster data.

20 Claims, 14 Drawing Sheets

(56) References Cited

U.S. PATENT DOCUMENTS

| | | | |
|---|---|---|---|
| 2009/0148039 A1 | 6/2009 | Chen et al. | |
| 2009/0287797 A1 | 11/2009 | Rasmussen et al. | |
| 2017/0083999 A1* | 3/2017 | Saurabh | G06T 1/60 |
| 2019/0108610 A1* | 4/2019 | Flordal | G06T 11/40 |
| 2022/0374304 A1 | 11/2022 | Beaumont | |

* cited by examiner

METHOD FOR PERFORMING TILE TO RASTER (T2R) CONVERSION IN DEEP LEARNING HARDWARE ACCELERATOR

CROSS-REFERENCE TO RELATED APPLICATION

This U.S. patent application claims priority under 35 USC § 119 to Indian Patent Application number 202341085894, filed on Dec. 15, 2023 in the Indian Intellectual Property Office, the disclosure of which is incorporated by reference in its entirety herein.

TECHNICAL FIELD

Embodiments of the present disclosure are generally directed to the field of image signal processing, and are more particularly directed to a method for performing Tile to Raster (T2R) conversion in a deep learning hardware accelerator.

DISCUSSION OF RELATED ART

Various image processing mechanisms are implemented in a hardware device using Deep-Learning Neural Networks (DNNs) to process input data such as images, two-dimensional (2D) matrix data, and visual data. An existing image processing system employs a mechanism that divides the input data into vertically stacked tiles to be subsequently processed with horizontally stacked macroblocks. For example, the mechanism may divide a high-resolution image into small tiles (e.g., tiles of size 32×32 pixels). The tiles may then be divided into smaller macroblocks (e.g., macroblocks of size 8×8 pixels) that are stacked horizontally. Thereafter, the existing image processing system uses the macroblocks to execute numerous computations and transformations on the high-resolution image.

Additionally, the existing image processing system may utilize industry-standard interfaces that are configured to read and write input data in a progressive raster scan order, which is a standard approach for accessing and displaying the input data. The existing image processing system also leverages a ping-pong buffer to assist conversion of vertically stacked tiles to a progressive raster scan order (Tile to Raster (T2R) conversion). An exemplary scenario depicting the ping-pong buffer to assist the T2R conversion is illustrated in FIG. 1A and FIG. 1B, in accordance with an existing state of the art. The ping-pong buffer is a mechanism that controls a flow of the input data between different components of the existing image processing system. In particular, the ping-pong buffer controls the flow of the input data between the vertically and horizontally stacked macroblocks and tiles.

However, the use of the ping-pong buffer increases a cost of temporarily storing the input data in a memory of a hardware device due to an increase in a storage area requirement (e.g., double storage area for Static Random-Access Memory (SRAM)). In other words, the existing image processing system requires additional SRAM to accommodate intermediate data during the T2R conversion process. As a result, the existing image processing system is not efficient in storing data, as the increased SRAM requirements potentially lead to higher costs of data storage and resource consumption.

Thus, there is a need for an alternate method of performing the T2R conversion more efficiently.

SUMMARY

According to an embodiment of the present disclosure, a method for performing Tile to Raster (T2R) conversion includes: receiving tile input data including a stream of a plurality of tiles each having a tile height, a tile input width, a macroblock width (MBW), and data bits; determining a total number of virtual square tiles among the plurality of tiles based on the received tile input width, tile height and the MBW; segmenting the tile input data based on the total number of virtual square tiles to generate segmented tile data, where the segmented tile data is arranged into one or more virtual square tiles in a spatial domain; segmenting, based on the received tile input data, a Tile Buffer (TB) into the one or more virtual square tiles in a storage domain to generated a segmented TB; and performing a raster-scanning operation on each of the segmented tile data and the segmented TB based on the determined total number of virtual square tiles to generate raster data. The method may further include outputting the raster data to a consumer device.

According to an embodiment of the present disclosure, a system for performing the T2R conversion includes a hardware accelerator configured to: receive tile input data including a stream of a plurality of tiles each having a tile height, a tile input width, and a macroblock width (MBW), and data bits determine a total number of virtual square tiles among the plurality of tiles based on the received tile input width, tile height and the MBW; segment the tile input data based on the total number of virtual square tiles to generate segmented tile data, where the segmented tile data is arranged into one or more virtual square tiles in the spatial domain; and segment, based on the received tile input data, a Tile Buffer (TB) into the one or more virtual square tiles in a storage domain. The hardware accelerator is further configured to perform a raster-scanning operation on each of the segmented tile data and the segmented TB based on the determined total number of virtual square tiles, to generate raster data. The hardware accelerator may be configured to output the raster data to a consumer device.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, exemplary embodiments are described in detail with reference to the accompanying drawings; however, they may be embodied in different forms and should not be construed as limited to the embodiments set forth herein. Also, the various embodiments described herein are not necessarily mutually exclusive, as some embodiments can be combined with one or more other embodiments to form new embodiments.

As is traditional in the field, embodiments may be described and illustrated in terms of blocks that carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the disclosure.

Figure 1A:
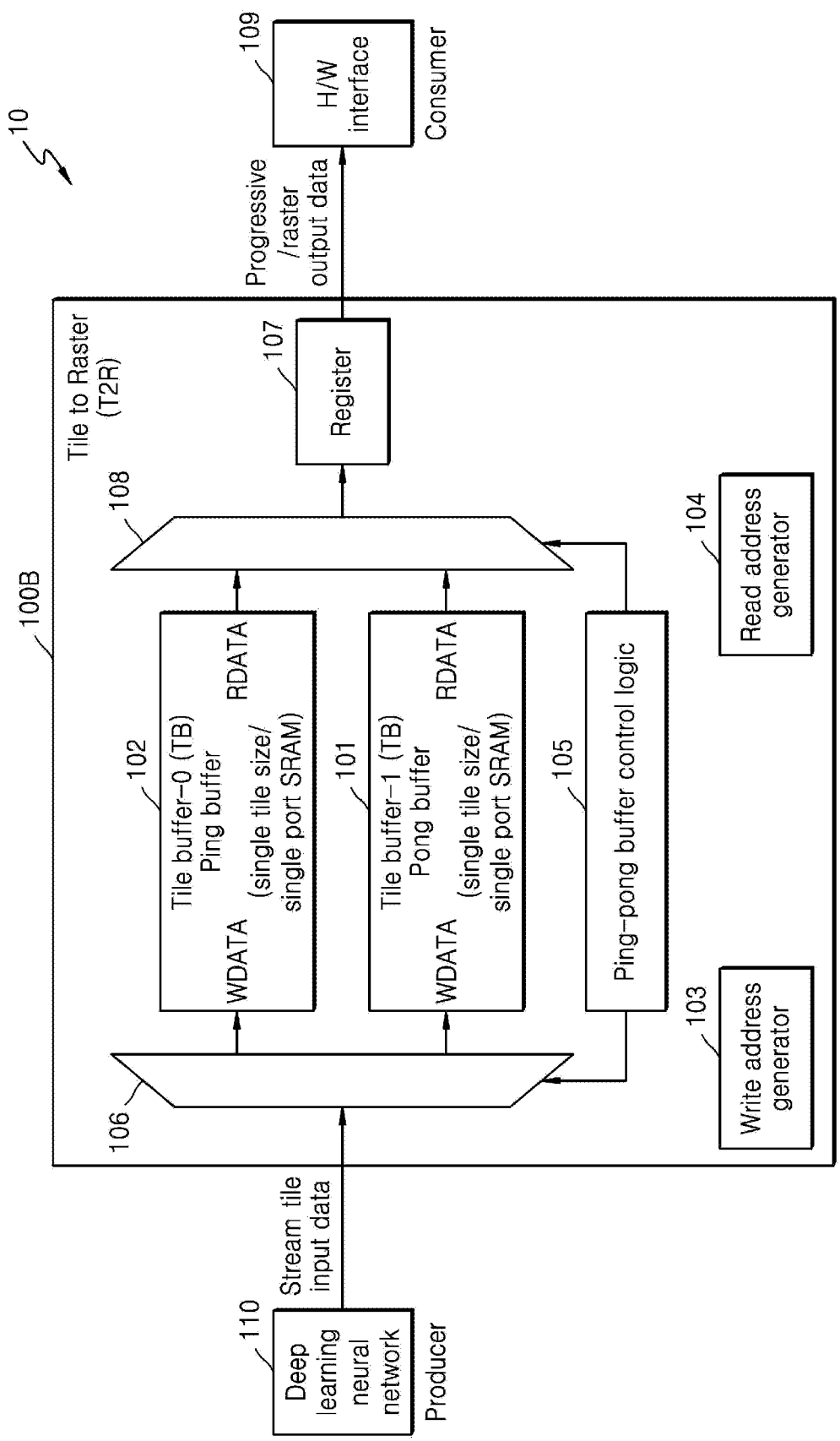
FIG. 1A illustrates an existing system with a ping-pong buffer to perform a Tile to Raster (T2R) conversion.
Figure 1B:
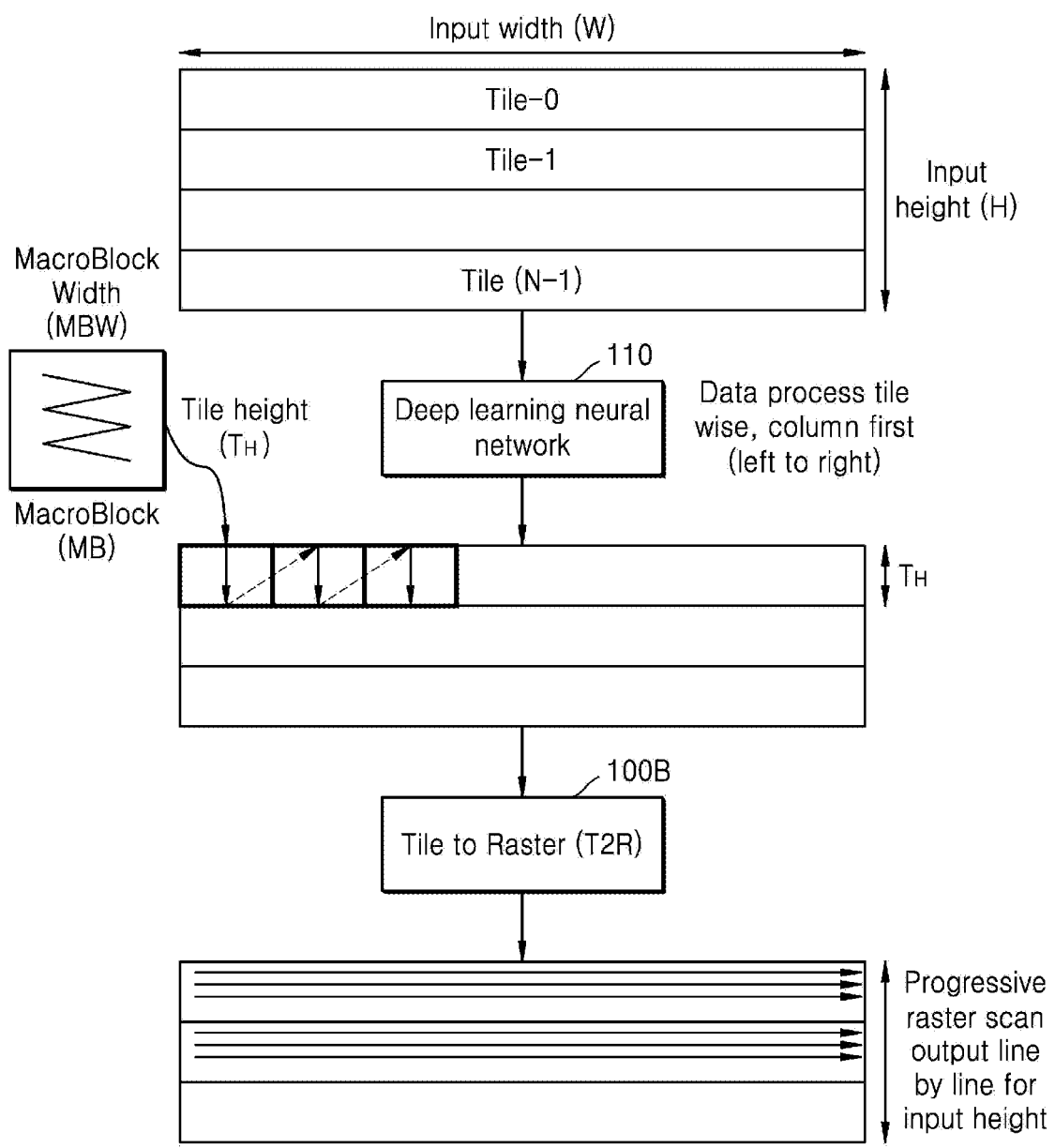
FIG. 1B illustrates an exemplary scenario depicting the ping-pong buffer of FIG. 1A being used to assist with the T2R conversion.

FIG. 1A illustrates an existing image processing system 10 with a ping-pong buffer to perform the T2R conversion process. The existing image processing system 10 includes a deep learning neural network 110 acting as a producer module, a Tile to Raster (T2R) module 100B, and a hardware (H/W) interface 109 acting as a consumer module. The producer module is configured to analyze, for example, video data and detect objects, such as people, vehicles, and animals. The video data includes small sections called tiles. For example, each tile represents a 16×16 pixel area of the overall scene. The tiles are then fed as streaming tile input data to the T2R module 100B. The T2R module 100B is a component of a hardware device (e.g., a camera system, a smartphone, etc.), and is configured to convert the incoming tile input data into a progressive scan/raster output data format, as illustrated in FIG. 1B, using one or more modules. This conversion is used for further processing and display of the video data. Once the conversion process has completed, the T2R module 100B is further configured to send the processed data to the consumer module for further processing. The T2R module 100B includes a de-multiplexer 106, a tile buffer-0 (ping buffer) 102, a tile buffer-1 (pong buffer) 101, a ping-pong buffer control logic 105, a write address generator 103, a read address generator 104, a multiplexer 108, and a register 107.

The de-multiplexer 106 is configured to demultiplex or separate the received tile input data into different channels or streams for efficient processing. The tile buffer-0 102 is a special memory buffer that serves as a temporary storage location for the received tile input data, which allows smooth read and write operations during the conversion process. The tile buffer-1 101 is another memory buffer used for temporarily storing data during the conversion process. The ping-pong buffer control logic 105 is configured to control a flow of the received tile input data between the tile buffer-0 102 and the tile buffer-1 101 during the conversion process. The write address generator 103 is configured to generate the memory addresses necessary for writing data into the tile buffer-0 102 and/or the tile buffer-1 101. The read address generator 104 is configured to generate the memory addresses for reading data from the tile buffer-0 102 and/or the tile buffer-1 101. The multiplexer 108 is configured to multiplex or combine the processed data from different streams back into a unified progressive scan/raster, which is used for further processing. The register 107 is configured to temporarily store intermediate values and control signals during the conversion process.

However, the use of the ping-pong buffer increases a cost of temporarily storing the input data in a memory of a hardware device due to an increase in a storage area requirement (e.g., double storage area for Static Random-Access Memory (SRAM)), for example, as illustrated in Table-1 and Table-2. In other words, the existing image processing system requires additional SRAM to accommodate intermediate data during the T2R conversion process. As a result, the existing image processing system 10 has certain limitations in terms of storage efficiency, as the increased SRAM requirements could potentially lead to higher costs of data storage and resource consumption.

TABLE 1

Example design parameters

| Image Width (W) | 5120 |
| Tile Height (H) | 20 |
| Bits per data (n) | 12 |
| Tile buffer size (in KB) | 150 |
| $\frac{W*H*n}{8*1024}$ | |

TABLE 2

| | | | | Area | | in | in | Total area |
|---|---|---|---|---|---|---|---|---|
| Group | Port | Words | BPW | (in um2) | instance | Kbits | KB | (in um2) |
| 2 tile buffer | 1 | 4096 | 128 | 16243 | 4 | 512 | 256 | 64972 |
| (150KB each) | 1 | 1408 | 128 | 6384 | 2 | 176 | 44 | 12768 |
| | | | | | | | 300 | 77740 |

To address these storage efficiency issues and increase the overall performance of the existing image processing system 10, the present disclosure provides an alternate method for the T2R conversion that helps reduce the dependency on the ping-pong buffer and decrease the needed storage area. The disclosed method is described below in forthcoming paragraphs in conjunction with FIGS. 2 to 9E.

Figure 2:
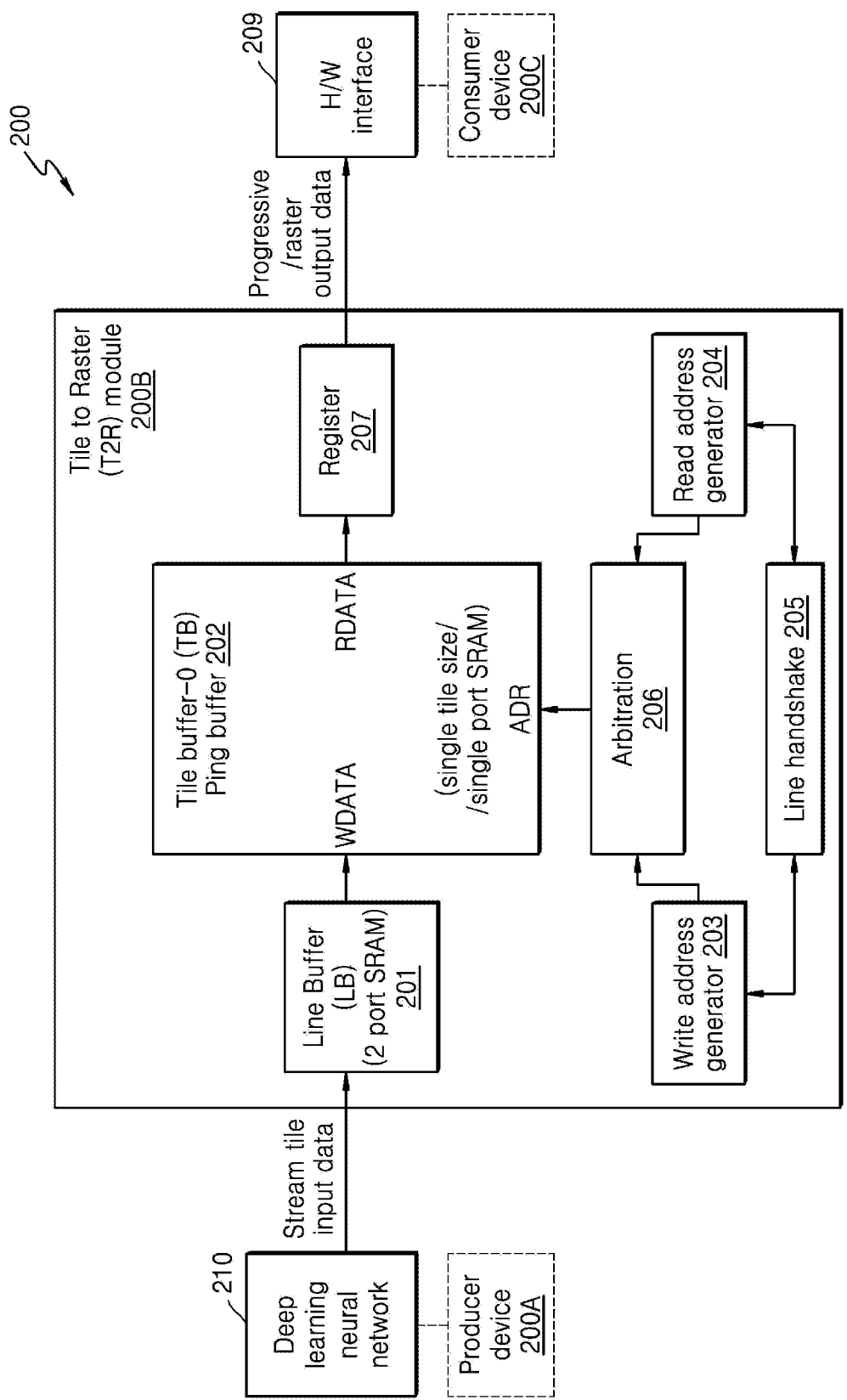
FIG. 2 illustrates a block diagram of a system for performing the T2R conversion, according to an embodiment of the disclosure.

FIG. 2 illustrates a block diagram of a system 200 for performing T2R conversion, according to an embodiment of the disclosure. In an embodiment, the system 200 includes a deep learning neural network 210 as a producer device 200A, a Tile to Raster (T2R) module 200B, and a H/W interface 209 as a consumer device 200C. The H/W interface 209 may be implemented by a legacy raster intellectual property block, but is not limited thereto. The H/W interface 209 may be a Display Serial Interface (DSI) or a Camera Serial Interface (CSI).

The T2R module 200B may be implemented by processing circuitry (e.g., a hardware accelerator) such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The hardware accelerator may be referred to as a deep learning hardware accelerator when it operates on data output by a deep learning neural network such as 210.

The T2R module 200B is configured to receive the tile input data from the producer device 200A. The tile input data may be received in column-by-column order. The tile input data may include a stream of a plurality of tiles each having a dimension of a specific tile height ($T_H$), a specific tile input width (W), and data bits. In an embodiment, the T2R module 200B is further configured to determine a total number (N) of virtual square tiles among the plurality of tiles based on the received specific tile input width (W), specific tile height ($T_H$) and a MacroBlock Width (MBW), as described in conjunction with FIG. 3. In an embodiment, the T2R module 200B is further configured to segment the tile input data, based on the total number (N) of virtual square tiles. In an embodiment, the segmented tile input data is arranged into one or more virtual square tiles in a spatial domain, as described in conjunction with FIG. 4. In an embodiment, the T2R module 200B is further configured to segment, based on the received tile input data, a Tile Buffer (TB) 202 into the one or more virtual square tiles in a storage domain, as described in conjunction with FIG. 5. In an embodiment, the T2R module 200B is further configured to perform, using one or more modules (i.e., T2R module 200B), a raster-scanning operation on each of the segmented tile input data and the segmented TB based on the determined total number (N) of virtual square tiles, as described in conjunction with FIG. 9A, FIG. 9B, FIG. 9C, FIG. 9D and FIG. 9E. The T2R module 200B is further configured to send raster output data to the consumer device 200C, based on the performed raster-scanning operation. For example, the raster-scanning operation may generate the raster output data.

In an embodiment, the T2R module 200B includes a line buffer 201, a tile buffer 202, a write address generator 203 (e.g., a logic circuit), a read address generator 204 (e.g., a logic circuit), a line handshake 205 (e.g., a logic circuit for performing a line handshake), an arbitration 206 (e.g., a logic circuit for performing an arbitration operation), and a register 207.

In an embodiment, the line buffer 201 is configured to temporarily store the received tile input data from the producer device 200A in a dual port SRAM. The purpose of the line buffer 201 is to ensure that there is no impact on the overall performance of the system 200. In an embodiment, the tile buffer 202 is implemented by a single port memory, and a read (RD) request (read operation) receives priority over a write (WR) request (write operation) during a read (RD) request (read operation) and a write (WR) request (write operation) in the same cycle to prevent a reduction in performance of the system 200. In an embodiment when the tile buffer 202 is full, the line buffer 201 acts a buffer to store the incoming data (i.e., received tile input data) generated by the producer device 200A. In an embodiment, the line buffer 201 has a width of one input line (W). When the tile buffer 202 is implemented by the single port memory, an area (e.g., a silicon area) occupied by the T2R module 200B may be reduced.

In an embodiment, the tile buffer 202 is a primary storage area, where the tile buffer 202 is configured to store the received tile input data ($T_H$×W) using the write address generator 203 before reading the received tile input data back in a transposed manner using the read address generator 204. In an embodiment, the received tile input data is written into the line buffer 201. The write address generator 203 is configured to read the received tile input data from the line buffer 201 and store the received tile input data in one of the Virtual Square Tiles "VST" of the tile buffer 202. The size of each "VST" is determined by the tile height "$T_H$" and macroblock width "MBW". Further, the total number of VSTs is determined by the tile height "$T_H$", input width (W) and macroblock width (MBW).

In an embodiment, the write address generator 203 is configured to generate one or more control signals to write the incoming data from the line buffer 201 into the tile buffer 202.

In an embodiment, when the system 200 is reset, the write address generator 203 begins with vertical writes (in one sweep/tile), followed by horizontal writes (in the next sweep/tile), utilizing the available memory once the read address generator 204 begins reading the data, and any empty lines available can be used by the write address generator 203, thereby increasing performance without having to wait for the entire memory to be read out by using a single port memory.

In an embodiment, the read address generator 204 is configured to generate one or more control signals to read the stored data from the tile buffer 202.

In an embodiment, the write address generator 203 is configured to alert the read address generator 204 when there is enough data in the tile buffer 202 for the read address generator 204 to read. For example, the write address generator 203 may provide a notification signal to the address generator 204 indicating there is enough data in the tile buffer 202 to read. In an embodiment when the system 200 is reset, the read address generator 204 begins with horizontal reads (in one sweep/Tile), followed by vertical readings (in the following sweep/Tile), utilizing the available memory, and releasing space for the write address generator 203 to write data in a freed-up area of the tile buffer 202.

In an embodiment, the line handshake 205 is configured to ensure that the write address generator 203 and the read address generator 204 communicate properly in terms of how many lines of data are available in the memory (e.g., tile buffer 202) for the read address generator 204 to read. The line handshake 205 may communicate with the write address generator 203 and the read address generator 204 to prevent the write address generator 203 from overwriting data of the tile buffer 202 before it is read by the read address generator 204. The read address generator 204 may return an "empty lines" status to the write address generator 203, which fills the tile buffer 202 in a following sweep/tile. If the read address generator 204 has not read any data, the write address generator 203 may ensure that the tile buffer 202 is not overwritten and remains in a "STALL" state until it receives the "empty lines" status from the read address generator 204.

In an embodiment, the arbitration 206 includes a single port memory. The arbitration 206 is configured to monitor various operations (e.g., read operation, write operation, etc.) associated with the write address generator 203 and the read address generator 204. When there is a conflict between writes and reads, the arbitration 206 is further configured to prioritize the read operation over the write operation by using an extra buffer (i.e., line buffer 201) to absorb data from the producer device 200A. In an embodiment, the arbitration 206 prioritizes a read operation of the read address generator 204 over a write operation of the write address generator 203.

In an embodiment, the register 207 is used as a First In, First Out (FIFO) to store some data read from the tile buffer 202 before it is sent back to the consumer device 200C.

In an embodiment, the system 200 has a higher storage efficiency than the existing image processing system 10. For example, the system 200 may store and manage data more effectively compared to the existing image processing system 10. As a result, the system 200 may handle larger amounts of data without wasting storage space. In an embodiment, the system 200 performs better than the existing image processing system 10. For example, the system 200 may operate more efficiently and effectively, ensuring that the producer device 200A (i.e., a device or component that generates or sends data) experiences no delays, which is beneficial because delays can slow down processes and affect the overall performance of the system 200. Further, the system 200 may ensure that the consumer device 200C (i.e., a device or component that receives or consumes data) does not encounter any bubbles or gaps. In other words, the system 200 may ensure there are no interruptions or breaks in a data flow, leading to a smooth and uninterrupted operation for the consumer device 200C. This is useful in applications where continuous data flow is required.

As a result, the system 200 may require less memory (e.g., SRAM) than the existing image processing system 10 due to its storage efficiency and performance, for example, as shown in Table-3 and Table-4. The SRAM is a type of memory used in electronic devices (hardware devices), and it can be expensive and resource-intensive. By reducing the SRAM requirements, the system 200 may potentially lead to cost savings in terms of memory components and also utilize resources more efficiently.

TABLE 3

SRAM required

| Group | Port | Words | BPW | Area (in um2) | instance | in Kbits | in KB | Total area (in um2) |
|---|---|---|---|---|---|---|---|---|
| Tile buffer (150KB) + Line buffer (7.25KB) | 1 | 4096 | 128 | 16243 | 2 | 512 | 128 | 32486 |
| | 1 | 1408 | 128 | 6384 | 1 | 176 | 22 | 6384 |
| | 2 | 464 | 128 | 3041 | 1 | 58 | 7.25 | 3041 |
| | | | | | | | 157.25 | 41911 |

TABLE 4

| Comparison between the system 200 (Table-3) and the existing system (Table-2) | |
|---|---|
| Area saving | 35829 |
| Area saving % | 46.09% |

Although FIG. 2 shows various hardware components of the system 200, it is to be understood that other embodiments are not limited thereto. In other embodiments, the system 200 may include a lessor or greater number of components. Further, the labels or names of the components are used only for illustrative purposes and do not limit the scope of the invention. One or more components can be combined to perform the same or substantially similar functions to perform the T2R conversion.

Figure 3:
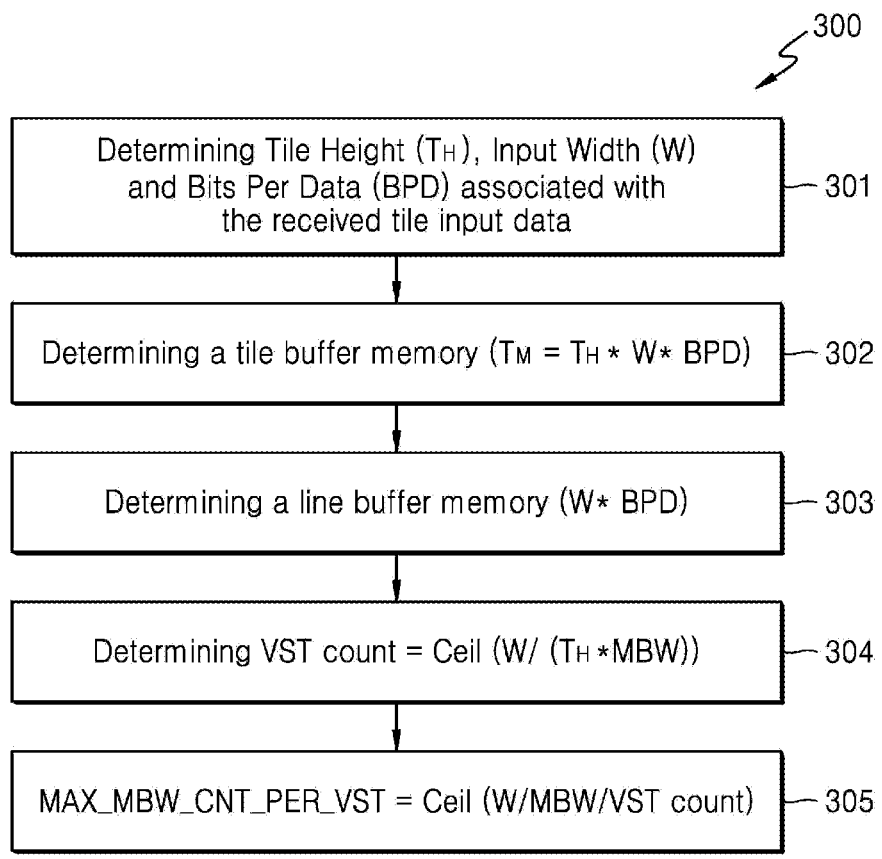
FIG. 3 is a flow diagram illustrating a method for determining one or more parameters from tile input data to perform the T2R conversion, according to an embodiment of the disclosure.

FIG. 3 is a flow diagram illustrating a method 300 for determining one or more parameters from the tile input data to perform the T2R conversion, according to an embodiment of the disclosure.

At step 301, the method 300 includes determining the tile height ($T_H$), the input width (W), and the bits per data (BPD) associated with the received tile input data. At step 302, the method 300 includes determining a tile buffer memory based on the determined tile height ($T_H$), the determined input width (W), and the determined bits per data (BPD). For example, a size of the tile buffer memory may be determined by $T_H*W*BPD$. At step 303, the method 300 includes determining a line buffer memory based on the determined input width (W), and the determined bits per data (BPD). For example, a size of the line buffer memory may be determined by W*BPD. At step 304, the method 300 includes determining a total number (N) of virtual square tiles (i.e., VST count) based on the determined tile height ($T_H$), the determined input width (W) and the determined macroblock width (MBW), for example, as shown in Table-5. For example, the total number may be determined by (W/$T_H$*MBW) or performing a ceiling operation on the same to round up the result to the nearest whole number. At step 305, the method 300 includes determining a total number of maximum Macroblock (MB) per VST based on the Ceil (W/MBW/VST count), for example, as shown in Table-5.

TABLE 5

| Design input parameters | |
| --- | --- |
| Input Width (W) | 5120 |
| Tile Height (TH) | 20 |
| Bits per Data (BPD) | 12 |
| MacroBlockWidth (MBW) | 32 |
| Design calculations | |
| Tile Buffer Size (in KB) (W * TH * BPD)/(8*1024) | 150 |
| Line Buffer Size (in KB) (W * BPD)/(8*1024) | 7.5 |
| VST Count (Ciel(W/(TH*MBW))) | 8 |
| MAX_MBW_CNT_PER_VST (Ceil(W/MBW/VST count)) | 20 |

Figure 4:
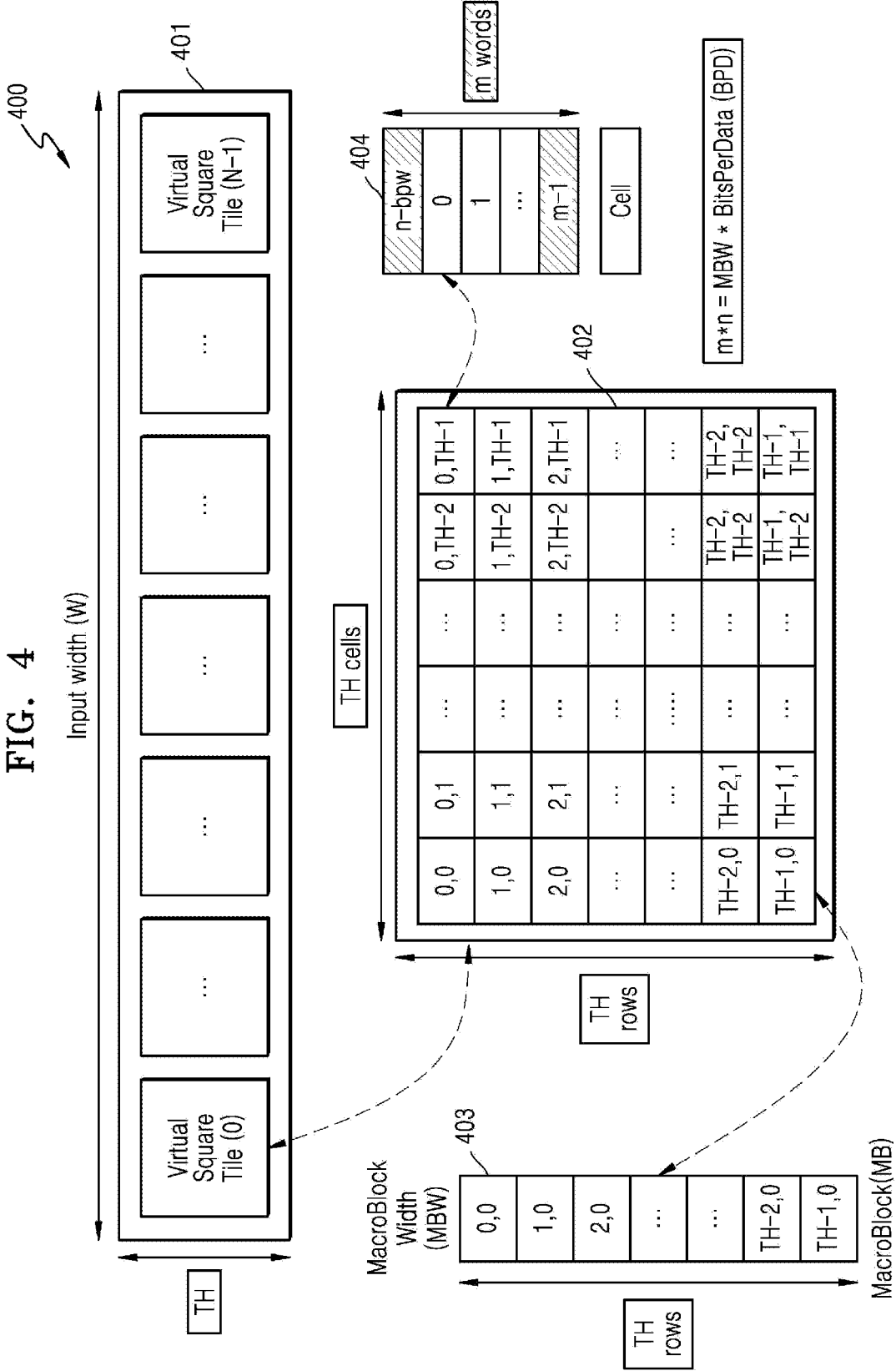
FIG. 4 illustrates an example scenario depicting a segmentation of the tile input data into one or more virtual square tiles in a spatial domain, according to an embodiment of the disclosure.

FIG. 4 illustrates an example scenario 400 depicting a segmentation of the tile input data into one or more virtual square tiles in the spatial domain, according to an embodiment of the disclosure.

In an embodiment, the T2R module 200B is configured to determine the total number (N) of virtual square tiles 401 among the plurality of tiles based on the received specific tile input width (W), specific tile height ($T_H$) and macroblock width (MBW), which relates to step 304 of FIG. 3. For example, if the tile input width (W) is 5120 and the specific tile height ($T_H$) is 20, the total number (N) of virtual square tiles 401 according to the Ceil (W/($T_H$*MBW)) is 8.

In an embodiment, each virtual square tile among the one or more virtual square tiles includes a plurality of columns and a plurality of elements 402. Each column of each virtual square tile corresponds to a Macroblock (MB) 403. Each element of each virtual square tile corresponds to a cell, "$T_H$ cells", (e.g., cell-1 (0,0), cell-2 (0,1), etc.).

In an embodiment, each MB 403 has a specific Macroblock Width (MBW) and a height. Each MB has the height equal to the specific tile height ($T_H$). Each MB 403 includes one or more data elements represented in the form of data bits.

In an embodiment, the T2R module 200B is configured to store, in each cell, one or more pixels in one or more-bit forms, where a size of each cell corresponds to one of a SRAM bit per word (n) or a group of SRAM words (m) of n-bits per word 404, where n and m are integers. Additionally, each cell may store one or more pixels/data.

Figure 5:
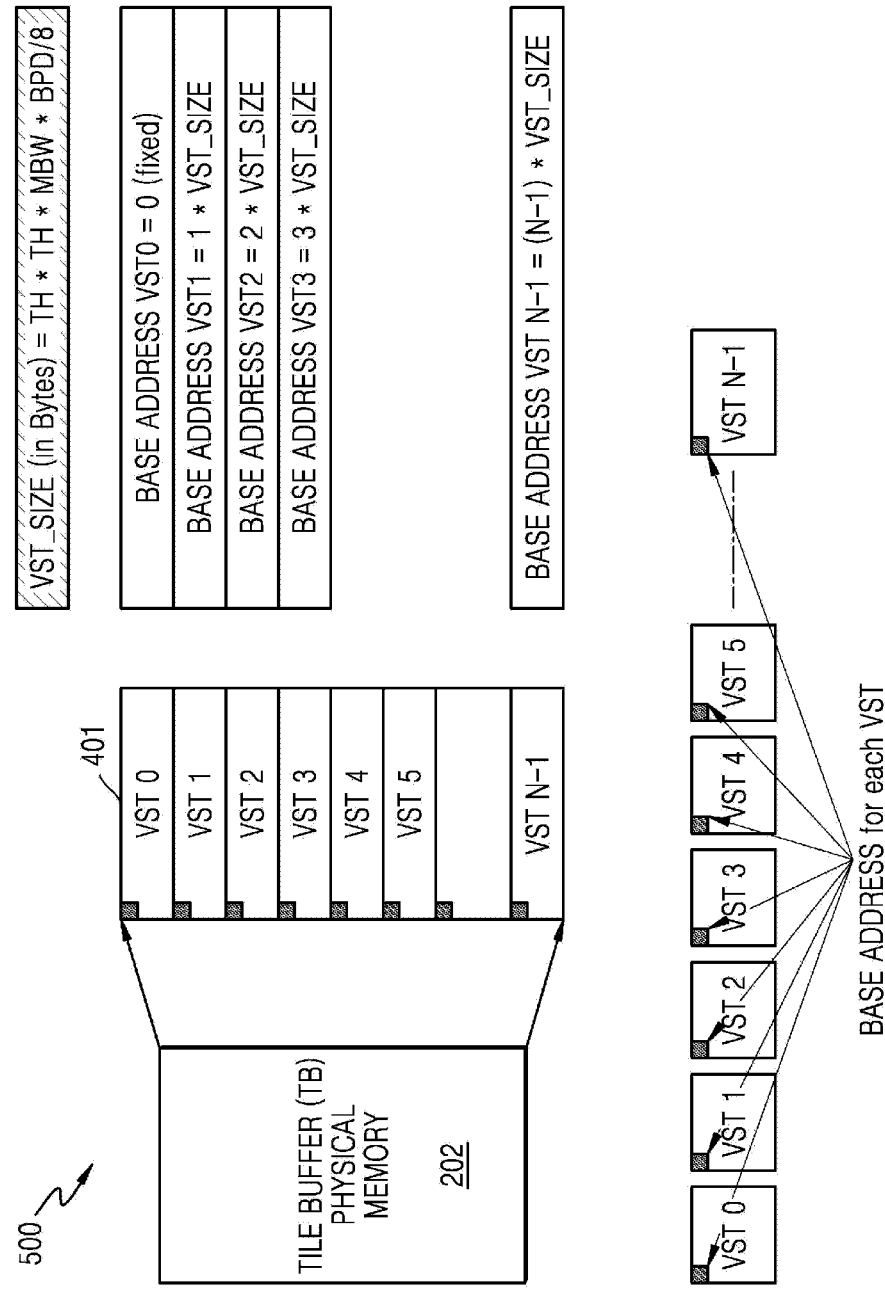
FIG. 5 illustrates an example scenario depicting a segmentation of a Tile Buffer (TB) into the one or more virtual square tiles in a storage domain, according to an embodiment of the disclosure.

FIG. 5 illustrates an example scenario 500 depicting a segmentation of a tile buffer (TB) 202 into the one or more virtual square tiles 401 (e.g., $VST_0$, $VST_1$, ..., $VST_{N-1}$) in the storage domain, according to an embodiment of the disclosure. In image processing, the term "spatial domain" refers to an arrangement of pixels in a matrix-like structure that aids in a visual interpretation. On the other side, the term "storage domain" refers to how the pixels are kept in the memory, specifically in SRAM, with each byte-addressable position. The terms "spatial domain" and "storage domain" are used to clarify pixel manipulation in connection to their real layout ("space") and storage locations ("storage").

Each VST has a specific size, which is determined based on the specific tile height ($T_H$), the specific Macroblock Width (MBW), and the determined bits per data (BPD) (e.g., VST_size (in bytes)=$T_H*T_H$*MBW*BPD/8). Each VST has specific base address, which is determined based on the specific size of the VST (e.g., Base address $VST_{N-1}$=(N-1) *VST_size), for example, as shown in Table-6.

TABLE 6

| Design Max Input Parameters | |
| --- | --- |
| Input Width (W) | 5120 |
| Tile Height (TH) | 20 |
| Bits per Data (BPD) | 12 |
| MacroBlockWidth (MBW) | 32 |
| Design Calculations | |
| Tile Buffer Size (in KB) (W * TH * BPD)/(8*1024) | 150 |
| Line Buffer Size (in KB) (W * BPD)/(8*1024) | 7.5 |
| VST Count (Ciel(W/(TH*MBW))) | 8 |
| MAX_MBW_CNT_PER_VST (Ceil(W/MBW/VST count)) | 20 |
| VST Size (in Bytes) (TH*TH*MBW*BPD/8) | 19200 |
| Base Address Calculations | |
| VST Base Addr0 | 0 |
| VST Base Addr1 | 19200 |
| VST Base Addr2 | 38400 |
| VST Base Addr3 | 57600 |
| VST Base Addr4 | 76800 |
| VST Base Addr5 | 96000 |
| VST Base Addr6 | 115200 |
| VST Base Addr7 | 134400 |

Figure 6:
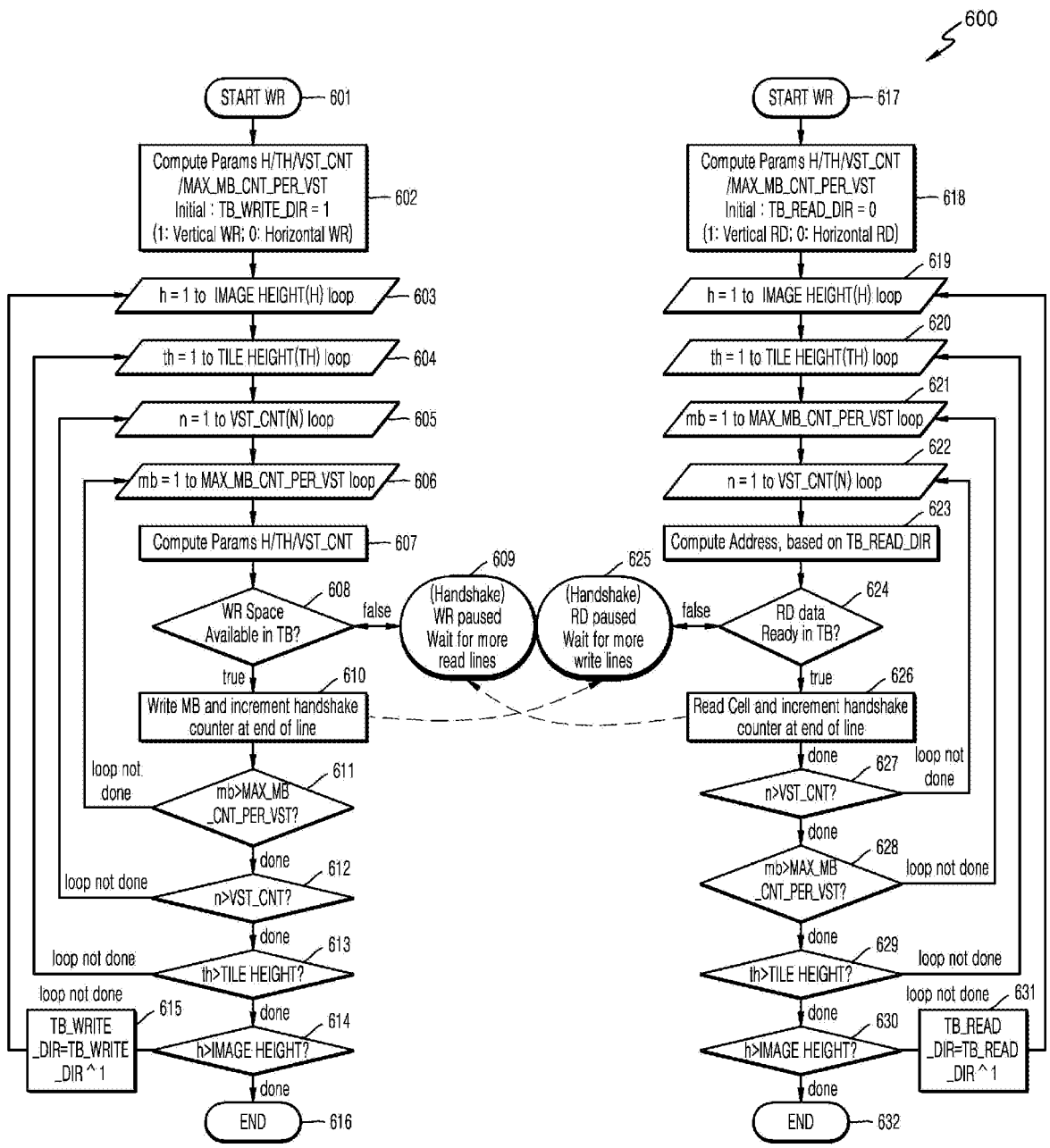
FIG. 6 is an example flow diagram illustrating a method for performing at least one of a read operation or a write operation based on one or more determined parameters, according to an embodiment of the disclosure.

FIG. 6 is an example flow diagram illustrating a method 600 for performing at least one of the read operation or the write operation based on the one or more determined parameters, according to an embodiment as disclosed herein.

At steps 601-602, the method 600 includes determining parameters of image height (h), tile height ($T_H$), VST_CNT (N), MAX_MB_CNT_PER_VST and an initial value associated with the write operation direction (e.g., TB_WRITE_DIR=1). At step 603, the method 600 includes an initialization of iteration loop "h" incrementing up to image height "H" with a step size of tile height ($T_H$). At step 604, the method 600 includes initialization of an iteration loop "th" incrementing up to tile height ($T_H$) with a step size of one. At step 605, the method 600 includes initialization of an iteration loop "n" incrementing up to a VST count (N) with a step size of one. At step 606, the method 600 includes initialization of an iteration loop "mb" incrementing up to a total number of maximum Macroblock (MB) per VST based on the Ceil (W/MBW/VST count) with a step size of one. At step 607, the method 600 includes determining an address of the tile buffer 202 based on the current iteration value(s) associated with the write operation of a MacroBlock (MB).

At step 608, the method 600 includes determining whether there is a space in the tile buffer 202 to store the current line of input data. At step 609, the method 600 includes pausing the write operation in response to determining that there is no space in the tile buffer 202 to write the current line. The operation can transition from 609 to step 608 in response to a read line completion. At step 610, the method 600 includes writing or storing the current MacroBlock (MB) and incrementing a value or counter in line handshake after a current line of input data has been written into the tile buffer 202.

At step 611, the method 600 includes determining whether a current value "mb" iteration exceeds the total value of the maximum Macroblock (MB) per VST (as determined in step 602) in response to step size increment. The method 600 includes executing one or more steps (i.e., 606 to 610) associated with the write operation in response to determining that the current value of the "mb" does not exceed the total value of the MAX_MB_CNT_PER_VST.

At step 612, the method 600 includes determining whether a current value "n" iteration exceeds a total value of the VST count (as determined in step 602) in response to step size increment. The method 600 includes executing one or more steps (i.e., 605 to 611) associated with the write operation in response to determining that the current value "n" does not exceed the total value of the VST count.

At step 613, the method 600 includes determining whether a current value "th" iteration exceeds the tile height ($T_H$) (as determined in step 602) in response to step size increment. The method 600 includes executing one or more steps (i.e., 604 to 612) associated with the write operation in response to determining that the current value of "th" iteration does not exceed the total value of the tile height ($T_H$).

At step 614, the method 600 includes determining whether a current value "h" iteration exceeds the total value of the image height "H" (as determined in step 602) in response to step size increment. At step 615, the method 600 includes inverting the current value associated with the write operation direction (TB_WRITE_DIR) and executing one or more steps (i.e., 603 to 614) associated with the write operation in response to determining that the current value of the iteration "h" does not exceed the total value of the image height "H". At step 616, the method 600 includes detecting that the write operation has completed in response to determining that the current value of the image height iteration "h" exceeds the total value of the image height "H".

At steps 617 and 618, the method 600 includes determining parameters of Image Height (H), tile height ($T_H$), VST_CNT (N), MAX_MB_CNT_PER_VST and an initial value associated with the read operation direction (e.g., TB_READ_DIR=0). At step 619, the method 600 includes initialization of an iteration loop "h" incrementing up to the image height "H" with step size of tile height ($T_H$). At step 620, the method 600 includes initialization of an iteration loop "th" incrementing up to tile height ($T_H$) with step size of one. At step 621, the method 600 includes initialization of an iteration loop "mb" incrementing up to a total number of maximum Macroblock (MB) per VST based on the Ceil (W/MBW/VST count) with step size of one. At step 622, the method 600 includes initialization of an iteration loop "n" incrementing up to VST count (N) with step size of one. At step 623, the method 600 includes determining an address of the tile buffer 202 based on the current value(s) associated with the read operation of a cell.

At step 624, the method 600 includes determining whether the current line to read is available in the tile buffer 202. At step 625, the method 600 includes pausing the read operation in response to determining that the required line has not yet written into the tile buffer 202. The operation can transition from step 625 to step 624 in response to a write line completion. At step 626, the method 600 includes reading the current cell data and incrementing a value or counter in the line handshake after the current line of data has been read from the tile buffer 202.

At step 627, the method 600 includes determining whether a current value "n" iteration exceeds a total value of the VST count (as determined in step 618) in response to a step size increment. The method 600 includes executing one or more steps (i.e., 622 to 627) associated with the read operation in response to determining that the current value "n" does not exceed the total value of the VST count.

At step 628, the method 600 includes determining whether a current value "mb" iteration exceeds the total value of the maximum Macroblock (MB) per VST (as determined in step 618) in response to a step size increment. The method 600 includes executing one or more steps (i.e., 621 to 628) associated with the read operation in response to determining that the current value of "mb" does not exceed the total value of the MAX_MB_CNT_PER_VST.

At step 629, the method 600 includes determining whether the current value "th" iteration exceeds the total value of the $T_H$ (as determined in step 618) in response to a step size increment. The method 600 includes executing one or more steps (i.e., 620 to 628) associated with the read operation in response to determining that the current value of "th" iteration does not exceed the total value of the tile height ($T_H$).

At step 630, the method 600 includes determining whether the current value "h" iteration exceeds the total value of the image height "H" (as determined in step 618) in response to a step size increment.

At step 631, the method 600 includes inverting the current value of a read direction (TB_READ_DIR) associated with the read operation and executing one or more steps (i.e., 619 to 630) associated with the read operation in response to determining that the current value of the iteration "h" does not exceed the total value of the image height "H". At step 632, the method 600 includes detecting that the read operation has completed in response to determining that the current value of the image height iteration "h" exceeds the total value of the image height "H".

Figure 7:
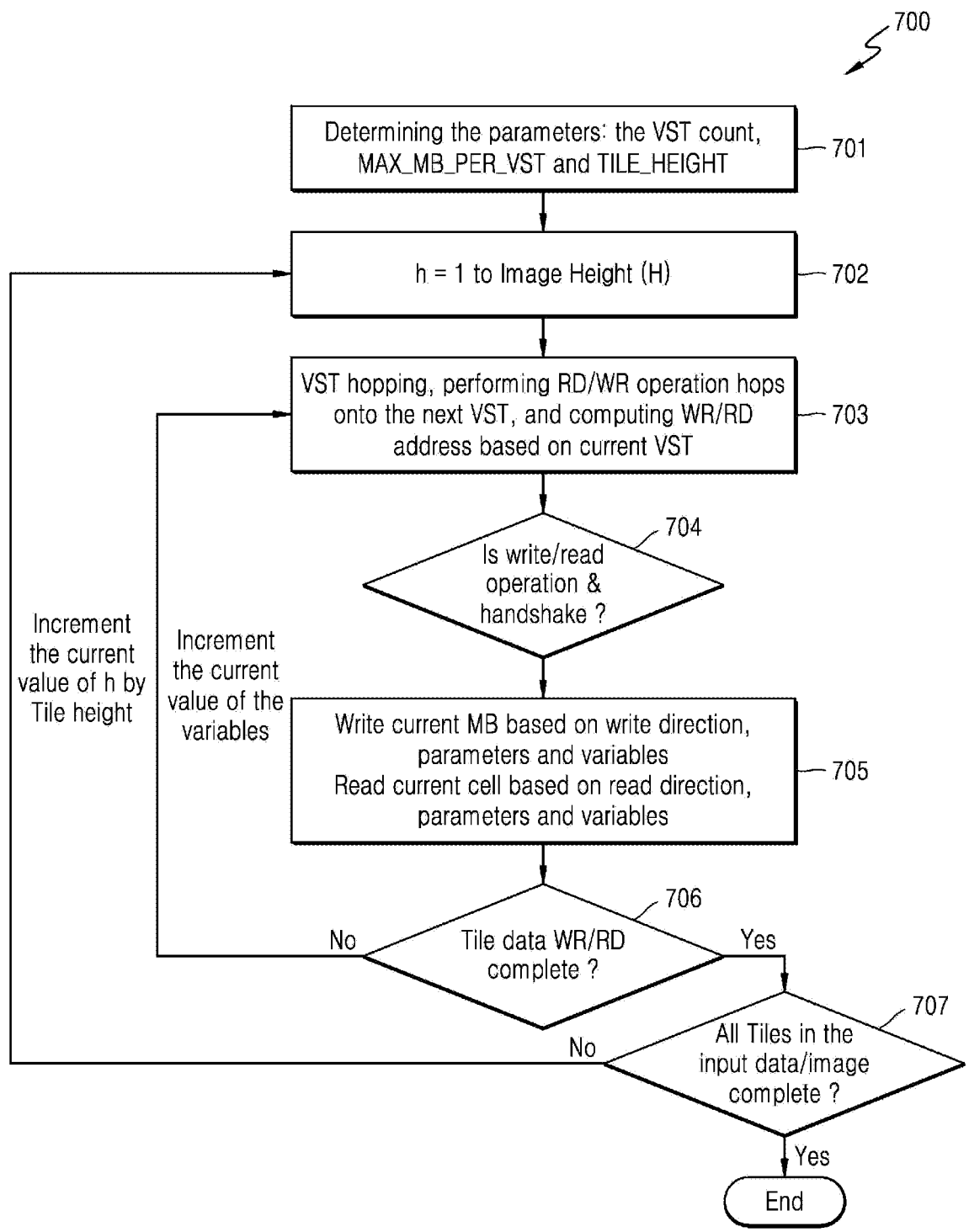
FIG. 7 is a flow diagram illustrating a method for hopping between a plurality of the virtual square tiles to perform at least one of the read operation or the write operation, according to an embodiment of the disclosure.

FIG. 7 is a flow diagram illustrating a method 700 for hopping between a plurality of the virtual square tiles to perform at least one of the read operation and the write operation, according to an embodiment of the disclosure.

At step 701, the method 700 includes determining a value of the VST count (total VST count), MAX_MB_PER_VST and tile height ($T_H$). At step 702, the method 700 includes initialization of iteration loop "h" incrementing up to image height (H). At step 703, the method 700 includes performing VST hopping once the parameters and variables are determined, performing the read or write operation hops onto the next VST (as described in conjunction with FIG. 9A, FIG. 9B, FIG. 9C, FIG. 9D, and FIG. 9E), and computing a write or read address based on the current VST.

At steps 704, the method 700 includes determining if there is enough space in the tile buffer 202 for the write operation and if there is a line available in the tile buffer 202 for read operation. If not, wait for the write and read handshake completion to proceed.

At steps 705, the method 700 includes writing the current macroblock (MB) into the tile buffer 202 based on the current write direction, current VST and the current MB to write. At step 705, the method 700 includes reading the current cell from the tile buffer 202 based on the current read direction, current VST and current line to read.

At step 706, the method 700 includes determining whether the current tile WR/RD operation has completed. The method 700 further includes incrementing the current value of the VST variable, the current MB variable, the current cell variable and executing one or more steps (i.e., 703 to 705) associated with the read or write operation in response to determining that the entire tile operation of WR/RD has not completed, (as described in conjunction with FIG. 9A, FIG. 9B, FIG. 9C, 9D and FIG. 9E).

At step 707, the method 700 includes determining whether the current value of "h" exceeds the total value of the image height (H). The method 700 further includes incrementing the current value of "h" and executing one or more steps (i.e., 702 to 706) associated with the read or write operation in response to determining that the current value of "h" does not exceed the total value of the image height (as described in conjunction with FIG. 9A, FIG. 9B, FIG. 9C, FIG. 9D, and FIG. 9E).

Figure 8:
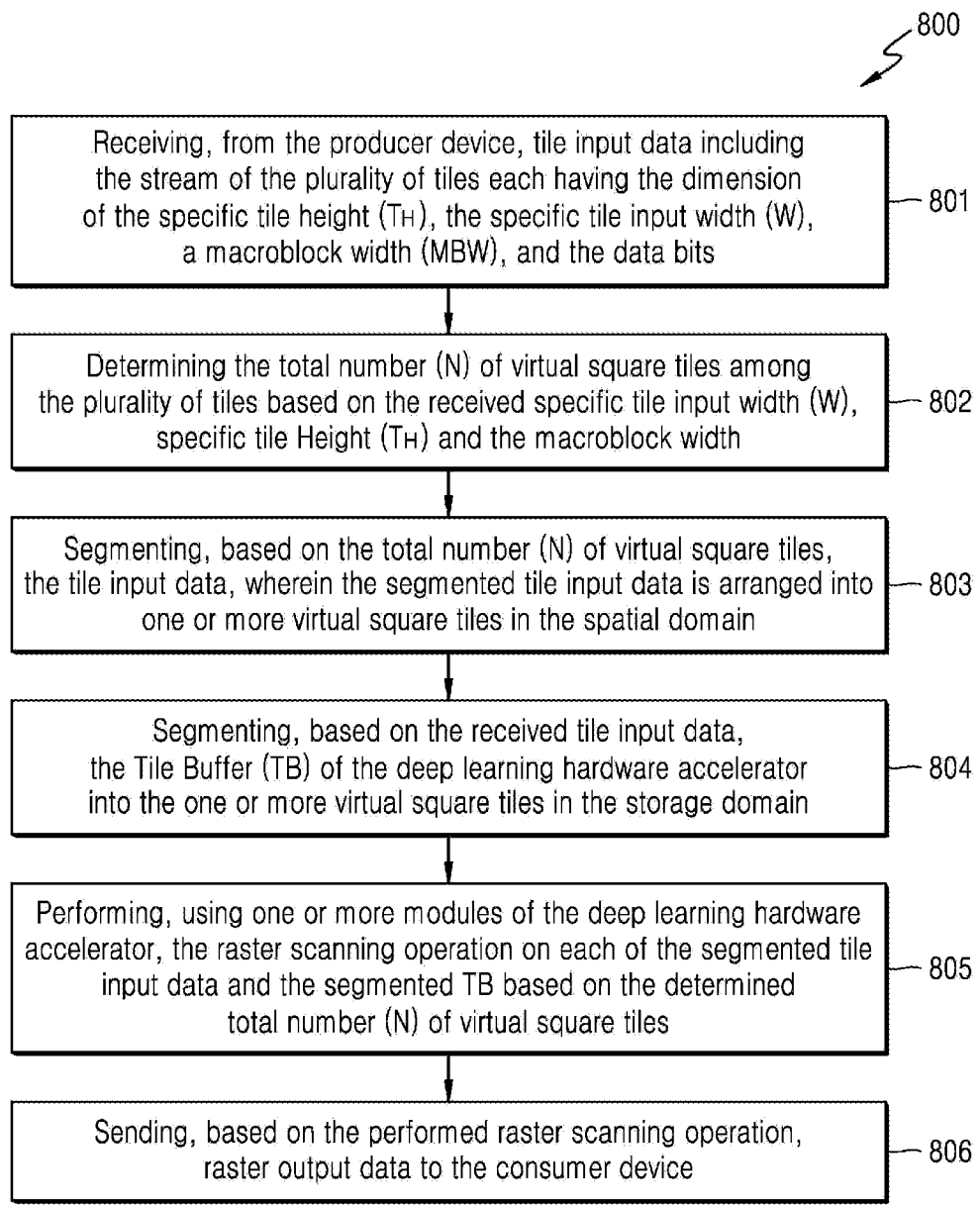
FIG. 8 is a flow diagram illustrating a method for performing the T2R conversion, according to an embodiment of the disclosure.

FIG. 8 is a flow diagram illustrating a method 800 for performing the T2R conversion, according to an embodiment of the disclosure.

At step 801, the method 800 includes receiving, from the producer device 200A, tile input data including the stream of the plurality of tiles each having the dimension of the specific tile height ($T_H$), the specific tile input width (W), the macroblock width (MBW), and the data bits.

At step 802, the method 800 includes determining the total number (N) of virtual square tiles among the plurality of tiles based on the received specific tile input width (W), specific tile height ($T_H$) and the macroblock width (MBW).

At step 803, the method 800 includes segmenting, based on the total number (N) of virtual square tiles, the tile input data, where the segmented tile input data is arranged into one or more virtual square tiles in the spatial domain, as illustrated in FIG. 4.

At step 804, the method 800 includes segmenting, based on the received tile input data, the tile buffer 202 into the one or more virtual square tiles in the storage domain, as illustrated in FIG. 5.

At step 805, the method 800 includes performing, using one or more modules (e.g., 201, 202, 203, 204, 205, 206, 207), the raster-scanning operation on each of the segmented tile input data and the segmented TB based on the determined total number (N) of virtual square tiles. In an embodiment, the raster-scanning operation includes at least one of the read operation and the write operation.

At step 806, the method 800 includes sending, based on the performed raster-scanning operation, raster output data to the consumer device 200C.

In an embodiment, each virtual square tile among the one or more virtual square tiles includes the plurality of columns and the plurality of elements, as illustrated in FIG. 4. Each column of each virtual square tile corresponds to a Macroblock (MB). Each element of each virtual square tile corresponds to the cell.

In an embodiment, each MB has the specific Macroblock Width (MBW) and the height, as illustrated in FIG. 4. Each MB has the height equal to the specific tile height ($T_H$). Each MB includes one or more data elements represented in the form of data bits.

In one or more embodiments, the method 800 includes storing, in each cell, one or more pixels in one or more-bit forms, wherein the size of each cell corresponds to one of the SRAM bit per word (n) or the group of SRAM words (m) of n-bits per word.

In an embodiment, the method 800 may execute multiple steps to perform the raster-scanning operation, which is discussed below.

Figure 9A:
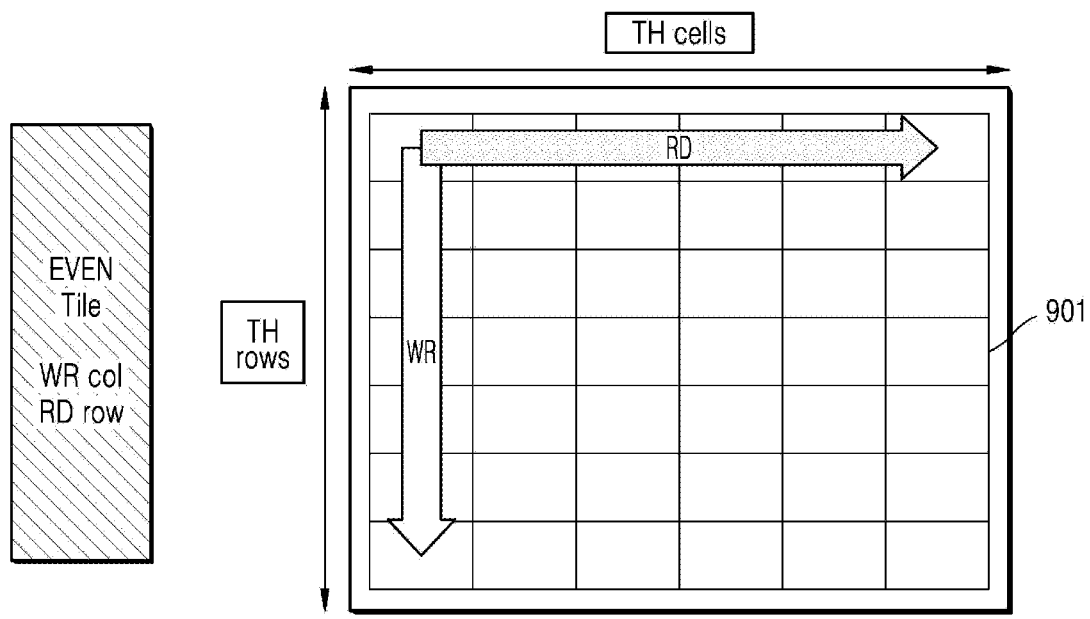
FIGS. 9A, 9B, 9C, 9D, and 9E illustrate exemplary scenarios to perform at least one of the read operation or the write operation, according to an embodiment of the disclosure.
Figure 9A:
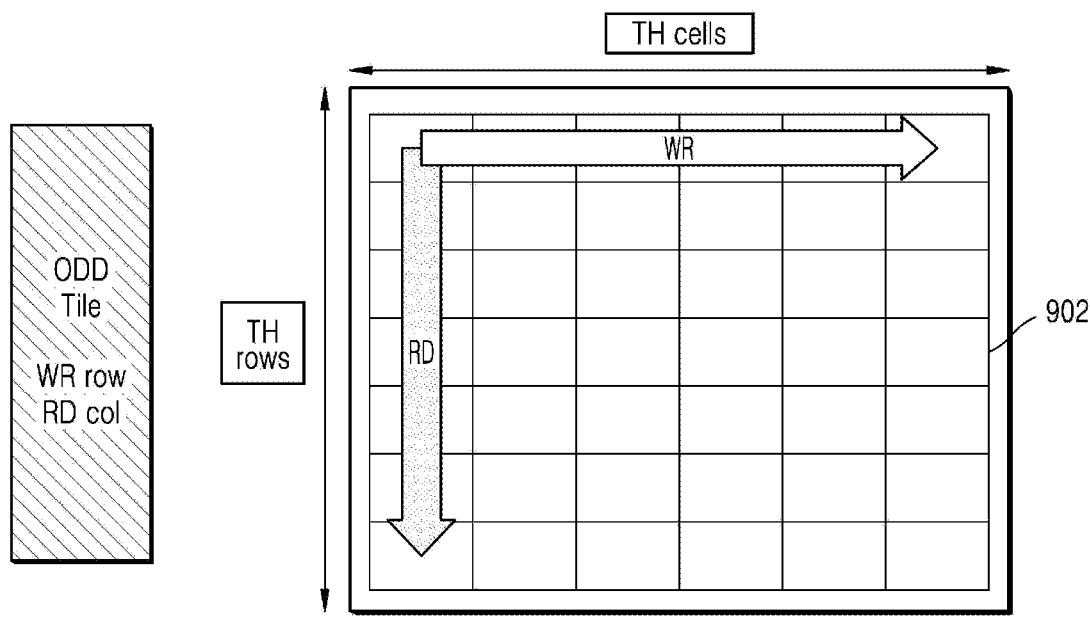

The method 800 may include detecting that the total number (N) of virtual square tiles is equal to one, as described in conjunction with FIG. 9A. The method 800 may further include determining whether the current tile is even or odd based on the specific tile height ($T_H$). In other words, the method 800 may include analyzing a frame (received tile input data) and dividing the frame into tile height ($T_H$) sections to determine whether the current tile is even or odd. The tiles are set in a particular pattern, beginning with an even tile, then an odd tile, another even tile, and so on until the last tile. In an embodiment, the specific tile height ($T_H$) provided as an input to a procedure device or a function to determine whether the tile is even or odd.

The method 800 may further include writing incoming Macroblock (MB) data in a column order and reading the line data in a row order, in response to a determination that the current tile is even. The method 800 may further include writing the incoming MB data in the row order and reading the line data in the column order, in response to a determination that the current tile is odd.

In an embodiments, the method 800 may execute multiple steps to perform the raster-scanning operation, which is discussed below.

The method 800 may include detecting that the total number (N) of virtual square tiles is more than one, as described in conjunction with FIG. 9B, FIG. 9C, FIG. 9D and FIG. 9E. The method 800 may further include determining whether the current tile is even or odd based on the specific tile height ($T_H$). The method 800 may further include writing the incoming Macroblock (MB) data by performing the virtual square tile (VST) hopping operation at an MB granularity in a column order and reading raster line data by performing the VST hopping operation at a cell granularity in a row order, in response to a determination that the current tile is even. The method 800 may further include writing the incoming MB data by performing the VST hopping operation at the MB granularity in the row order and reading the raster line data by performing the VST hopping operation at the cell granularity in the column order, in response to a determination that the current tile is odd.

FIGS. 9A, 9B, 9C, 9D, and 9E illustrate exemplary scenarios to perform at least one of the read operation and the write operation, according to an embodiment of the disclosure.

Referring to FIG. 9A, the T2R module 200B is configured to detect that the total number (N) of virtual square tiles is equal to one (i.e., N=1). Herein, segmentation of a tile into the VST simplifies a read (RD)/write (WR) address calculation to a square matrix transpose for every next tile. The T2R module 200B is further configured to determine whether the current tile is even or odd based on the specific tile height ($T_H$). The T2R module 200B is further configured to write (i.e., write operation) incoming Macroblock (MB) data in the column order and read (i.e., read operation) the raster line data in the row order, in response to the determination that the current tile is even 901. The T2R module 200B is further configured to write the incoming MB data in the row order and read the raster line data in the column order, in response to a determination that the current tile is odd 902.

Figure 9B:
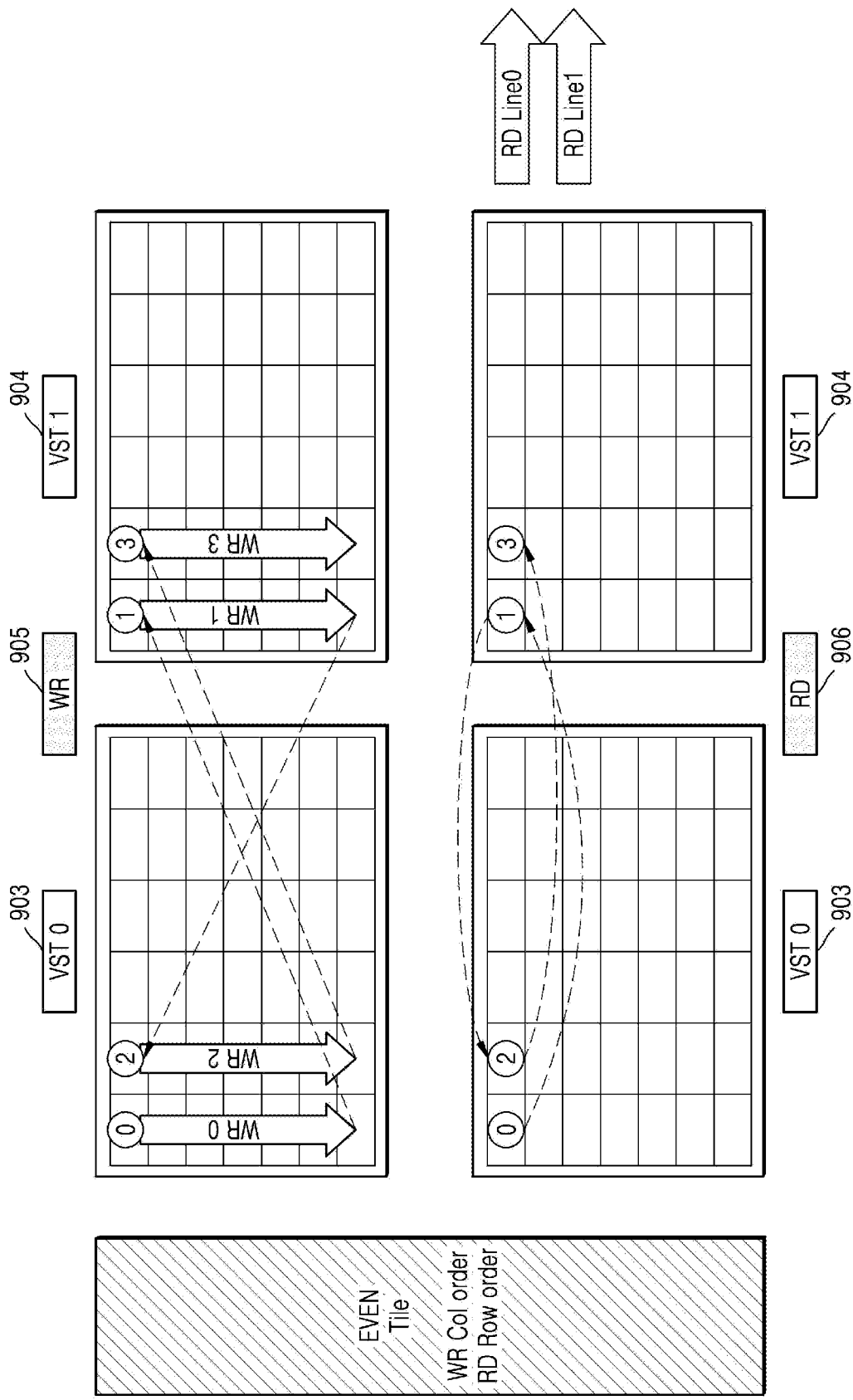

Referring to FIG. 9B, the T2R module 200B is configured to detect that the total number (N) of virtual square tiles is more than one, N=2 (i.e., VST-0 903 and VST-1 904). The T2R module 200B is further configured to determine whether the current tile is even or odd based on the specific tile height ($T_H$). The T2R module 200B is further configured to write 905 the incoming Macroblock (MB) data by performing the VST hopping operation at the MB granularity in the column order and read 906 the raster line data by performing the VST hopping operation at the cell granularity in the row order, in response to the determination that the current tile is even.

Figure 9C:
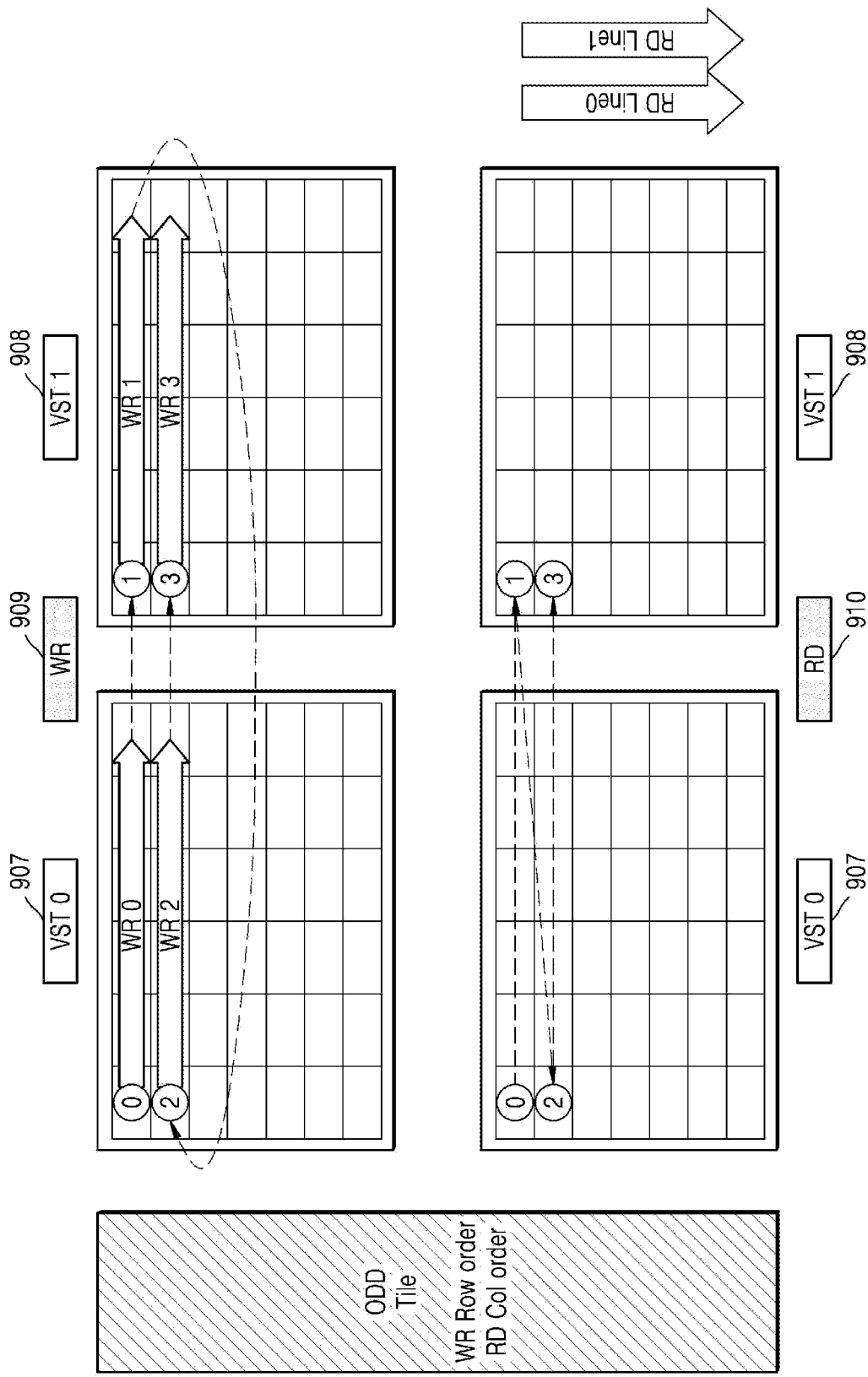

Referring to FIG. 9C, the T2R module 200B is configured to detect that the total number (N) of virtual square tiles is more than one, N=2 (i.e., VST-0 907 and VST-1 908). The T2R module 200B is further configured to determine whether the current tile is even or odd based on the specific tile height ($T_H$). The T2R module 200B is further configured to write 909 the incoming MB data by performing the VST hopping operation at the MB granularity in the row order and read 910 the raster line data by performing the VST hopping operation at the cell granularity in the column order, in response to a determination that the current tile is odd.

Figure 9D:
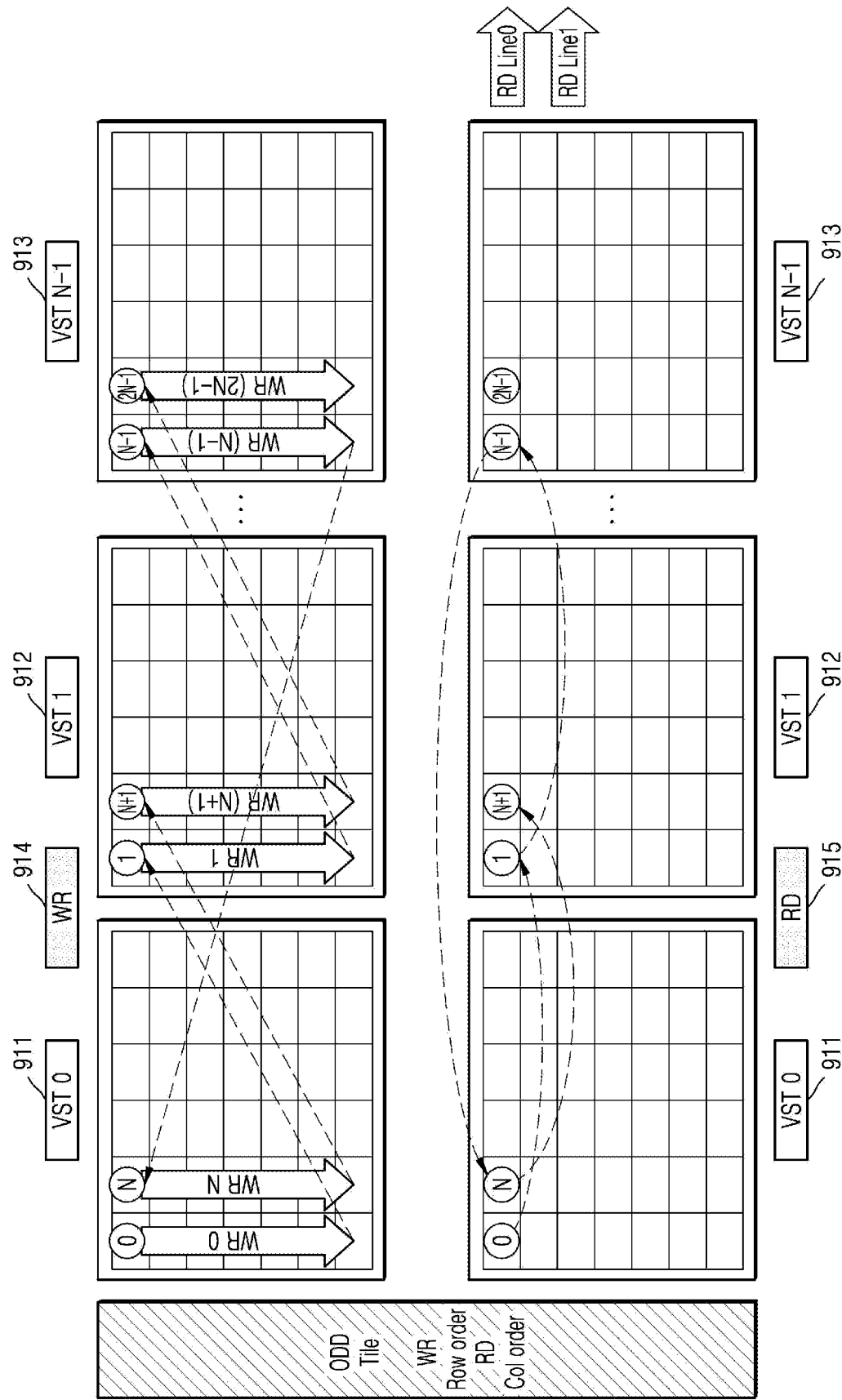

Referring to FIG. 9D, the T2R module 200B is configured to detect that the total number (N) of virtual square tiles is more than one, N>2 (i.e., VST-0 911, VST-1 912, . . . , $VST_{N-1}$ 913). The T2R module 200B is further configured to determine whether the current tile is even or odd based on the specific tile height ($T_H$). The T2R module 200B is further configured to write 914 the incoming Macroblock (MB) data by performing the VST hopping operation at the MB granularity in the column order and read 915 the raster line data by performing the VST hopping operation at the cell granularity in the row order, in response to the determination that the current tile is even.

Figure 9E:
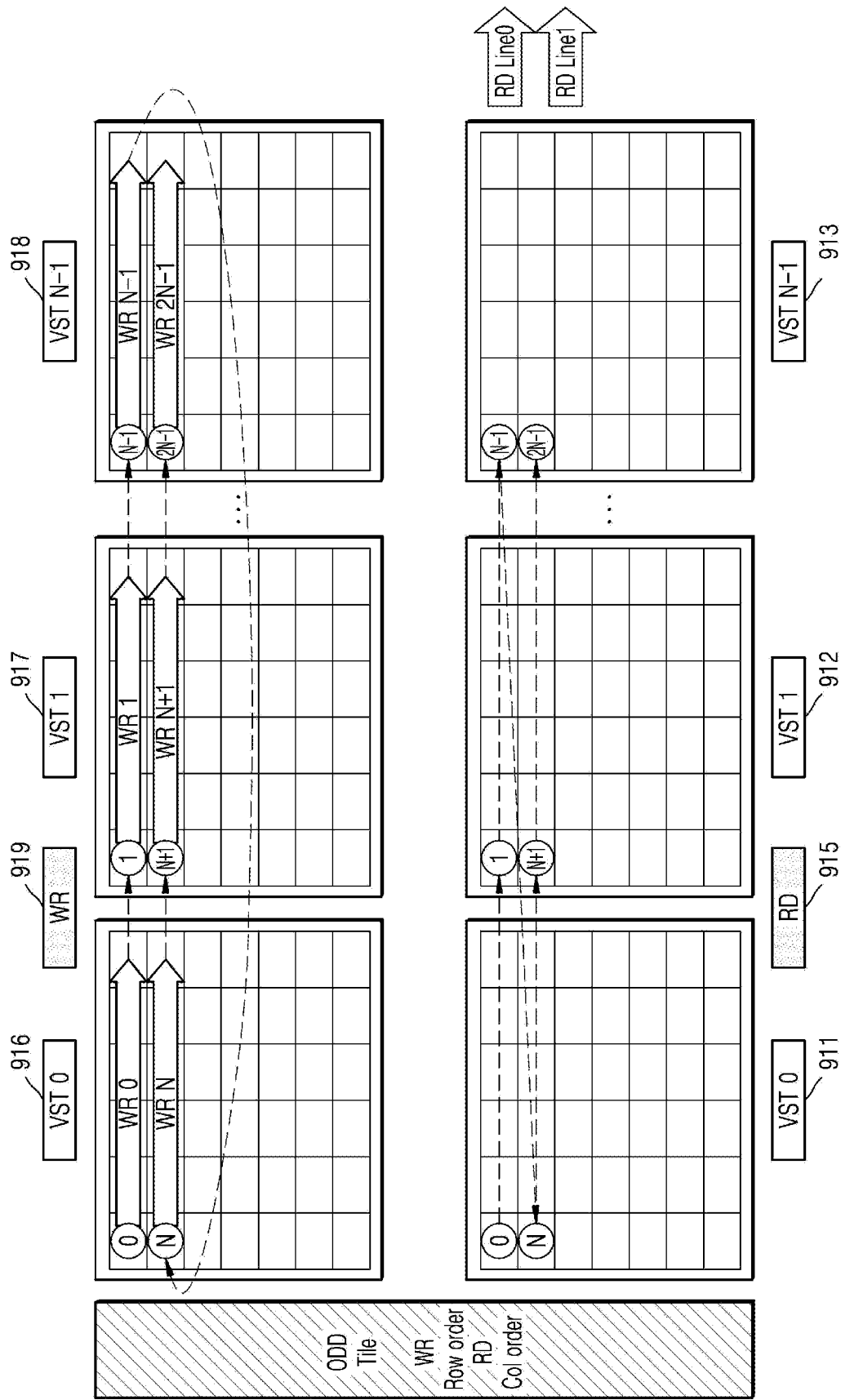

Referring to FIG. 9E, the T2R module 200B is configured to detect that the total number (N) of virtual square tiles is more than one, N>2 (i.e., VST-0 916, VST-1 917, . . . , $VST_{N-1}$ 918). The T2R module 200B is further configured to determine whether the current tile is even or odd based on the specific tile height ($T_H$). The T2R module 200B is further configured to write 919 the incoming MB data by performing the VST hopping operation at the MB granularity in the row order and read 920 the raster line data by performing the VST hopping operation at the cell granularity in the column order, in response to a determination that the current tile is odd.

The various actions, acts, blocks, steps, or the like in the flow diagrams may be performed in the order presented, in a different order, or simultaneously. Further, in some embodiments, some of the actions, acts, blocks, steps, or the like may be omitted, added, modified, skipped, or the like without departing from the scope of the invention.

Those skilled in the art will appreciate that one or more of the described elements may well be combined into a single functional element. Alternatively, certain elements may be split into multiple functional elements. Elements from one embodiment may be added to another embodiment.

At least one of the embodiments disclosed herein can be implemented using at least one hardware device performing network management functions to control the elements. While various embodiments herein have been described, those skilled in the art will recognize that the embodiments herein can be practiced with modification within the scope of the embodiments as described herein.

What is claimed is:

1. A method for performing a Tile to Raster (T2R) conversion, the method comprises:
   receiving tile input data including a stream of a plurality of tiles each having a tile height, a tile input width, a macroblock width (MBW), and data bits;
   determining a total number of virtual square tiles among the plurality of tiles based on the received tile input width, MBW and tile height;
   segmenting the tile input data based on the total number of virtual square tiles to generate segmented tile data, wherein the segmented data is arranged into one or more virtual square tiles in a spatial domain;
   segmenting, based on the received tile input data, a Tile Buffer (TB) into the one or more virtual square tiles in a storage domain to generate a segmented TB; and
   performing a raster-scanning operation on each of the segmented tile data and the segmented TB based on the determined total number of virtual square tiles, to generate raster data.

2. The method of claim 1, wherein the raster-scanning operation comprises at least one of a read operation or a write operation.

3. The method of claim 1,
   wherein each virtual square tile among the one or more virtual square tiles comprises a plurality of columns and a plurality of elements,
   wherein each column of each virtual square tile corresponds to a Macroblock (MB); and
   wherein each element of each virtual square tile corresponds to a cell among a plurality of cells.

4. The method of claim 3,
   wherein each MB has the MBW and a height equal to the tile height, and
   wherein each MB includes one or more data bits.

5. The method of claim 3, comprising:
   storing, in each cell, bit data of one or more pixels, wherein a size of each cell corresponds to one of a Static Random-Access Memory (SRAM) word of size n or a group of SRAM words of n-bits per word, where n is an integer.

6. The method of claim 1, wherein performing the raster-scanning operation comprises: in response to detecting that the total number of virtual square tiles is equal to one,
   determining whether a current tile is even or odd based on the tile height; and
   performing one of:
      writing incoming Macroblock (MB) data in a column order and reading the incoming MB data in a row order, in response to a determination that the current tile is even; or
      writing the incoming MB data in the row order and reading the incoming MB data in the column order, in response to a determination that the current tile is odd.

7. The method of claim 1, wherein performing the raster-scanning operation comprises: in response to detecting that the total number of virtual square tiles is more than one,
   determining whether a current tile is even or odd based on the specific tile height; and
   performing one of:
      writing an incoming Macroblock (MB) data by performing a virtual square tile (VST) hopping operation at an MB granularity in a column order and reading the incoming MB data by performing the VST hopping operation at a cell granularity in a row order, in response to a determination that the current tile is even; or
      writing the incoming MB data by performing the VST hopping operation at the MB granularity in the row order and reading the incoming MB data by performing the VST hopping operation at the cell granularity in the column order, in response to a determination that the current tile is odd.

8. The method of claim 1, wherein a hardware accelerator for performing the T2R conversion comprises:
a line buffer configured to temporarily store the tile input data;
a write address generator configured to write data from the line buffer to the tile buffer; and
a read address generator configured to read data from the tile buffer.

9. The method of claim 8, wherein the hardware accelerator further comprises a line handshake module configured to communicate with the write address generator and the read address generator to prevent the write address generator from overwriting data of the tile buffer before it is read by the read address generator.

10. The method of claim 8, wherein the hardware accelerator further comprises an arbitration module that prioritizes a read operation of the read address generator over a write operation of the write address generator.

11. A system for performing Tile to Raster (T2R) conversion, the system comprising:
a hardware accelerator configured to:
receive tile input data including a stream of a plurality of tiles each having a tile height, a tile input width, a macroblock width (MBW), and data bits;
determine a total number of virtual square tiles among the plurality of tiles based on the received tile input width, MBW and tile height;
segment the tile input data based on the total number of virtual square tiles to generate segmented tile data, wherein the segmented tile data is arranged into one or more virtual square tiles in a spatial domain;
segment, based on the received tile input data, a Tile Buffer (TB) into the one or more virtual square tiles in a storage domain to generate a segmented TB; and
perform a raster-scanning operation on each of the segmented tile data and the segmented TB based on the determined total number of virtual square tiles, to generate raster data.

12. The system of claim 11, wherein the raster-scanning operation comprises at least one of a read operation or a write operation.

13. The system of claim 11,
wherein each virtual square tile among the one or more virtual square tiles comprises a plurality of columns and a plurality of elements,
wherein each column of each virtual square tile corresponds to a Macroblock (MB); and
wherein each element of each virtual square tile corresponds to a cell.

14. The system of claim 13,
wherein each MB has the MBW and a height equal to the tile height, and
wherein each MB includes one or more data bits.

15. The system of claim 13, wherein the hardware accelerator stores, in each cell, bit data of one or more pixels, wherein a size of each cell corresponds to one of a Static Random-Access Memory (SRAM) word of size n or a group of SRAM words of n-bits per word, where n is an integer.

16. The system of claim 11, wherein the hardware accelerator performs the raster-scanning operation by:
in response to detecting that the total number of virtual square tiles is equal to one,
determining whether a current tile is even or odd based on the specific tile height; and
performing one of:
writing incoming Macroblock (MB) data in a column order and reading the incoming MB data in a row order, in response to a determination that the current tile is even; or
writing the incoming MB data in the row order and reading the incoming MB data in the column order, in response to a determination that the current tile is odd.

17. The system of claim 11, wherein the hardware accelerator performs the raster-scanning operation by:
in response to detecting that the total number of virtual square tiles is more than one;
determining whether a current tile is even or odd based on the specific tile height; and
performing one of:
writing an incoming Macroblock (MB) data by performing a virtual square tile (VST) hopping operation at an MB granularity in a column order and reading the incoming MB data by performing the VST hopping operation at a cell granularity in a row order, in response to a determination that the current tile is even; or
writing the incoming MB data by performing the VST hopping operation at the MB granularity in the row order and reading the incoming MB data by performing the VST hopping operation at the cell granularity in the column order, in response to a determination that the current tile is odd.

18. The system of claim 11, wherein the hardware accelerator comprises:
a line buffer configured to temporarily store the tile input data;
a write address generator configured to write data from the line buffer to the tile buffer; and
a read address generator configured to read data from the tile buffer.

19. The system of claim 18, wherein the hardware accelerator further comprises a line handshake module configured to communicate with the write address generator and the read address generator to prevent the write address generator from overwriting data of the tile buffer before it is read by the read address generator.

20. A method for performing a Tile to Raster (T2R) conversion, the method comprises:
receiving tile input data including a stream of a plurality of tiles each having a tile height, a tile input width, a macroblock width (MBW), and data bits;
determining a total number of virtual square tiles among the plurality of tiles based on the received tile input width, MBW and tile height;
segmenting the tile input data based on the total number of virtual square tiles to generate segmented tile data, wherein the segmented data is arranged into one or more virtual square tiles in a spatial domain;
segmenting, based on the received tile input data, a Tile Buffer (TB) into the one or more virtual square tiles in a storage domain to generate a segmented TB;
performing a raster-scanning operation on each of the segmented tile data and the segmented TB based on the determined total number of virtual square tiles, to generate raster data;
wherein performing the raster-scanning operation comprises:
determining whether a current tile is even or odd based on the specific tile height, in response to detecting that the total number of virtual square tiles is more than one; and writing an incoming Macroblock (MB) data and reading the incoming MB data by performing a virtual square tile (VST) hopping operation, in response to a determination.

* * * * *